United States Patent [19]
Richardson

[11] 3,788,051
[45] Jan. 29, 1974

[54] DEVICE FOR ATTACHING TINE EXTENSIONS TO CUTTER BAR
[75] Inventor: Raymond W. Richardson, Cawker City, Kans.
[73] Assignee: Richardson Manufacturing Company, Inc., Cawker City, Kans.
[22] Filed: Jan. 17, 1973
[21] Appl. No.: 324,348

[52] U.S. Cl. .............................................. 56/318
[51] Int. Cl. ........................................... A01d 65/02
[58] Field of Search....... 56/312, 313, 314, 318–320

[56] References Cited
UNITED STATES PATENTS
743,243   11/1903   Calling................................. 56/313
2,746,231   5/1956   Ayers................................... 56/318
2,839,884   6/1958   Bishop.................................. 56/318

Primary Examiner—Russell R. Kinsey
Assistant Examiner—J. A. Oliff
Attorney, Agent, or Firm—D. A. N. Chasem

[57] ABSTRACT

A releasable fastening device of universal character which is employed to detachably secure sickle guard extensions to the cutter bar assembly of a combine. An elongated, resilient clip of heavy steel wire extends across a series of three of the extensions with its opposed end portions engaging the two outer extensions of the series. A catch is secured to the sickle guard support bar by the center sickle guard bolt, and the clip is flexed rearwardly into engagement with the catch. The central portion of the clip seats within notches provided in the catch to hold the clip in the flexed condition.

10 Claims, 8 Drawing Figures

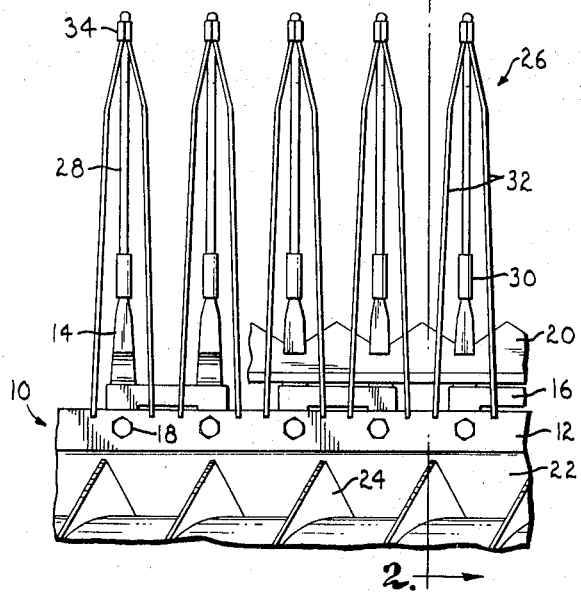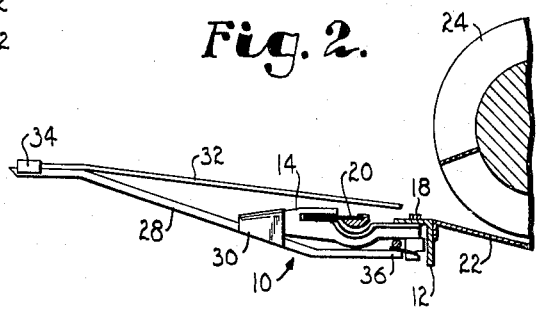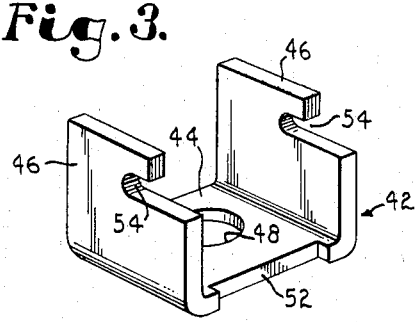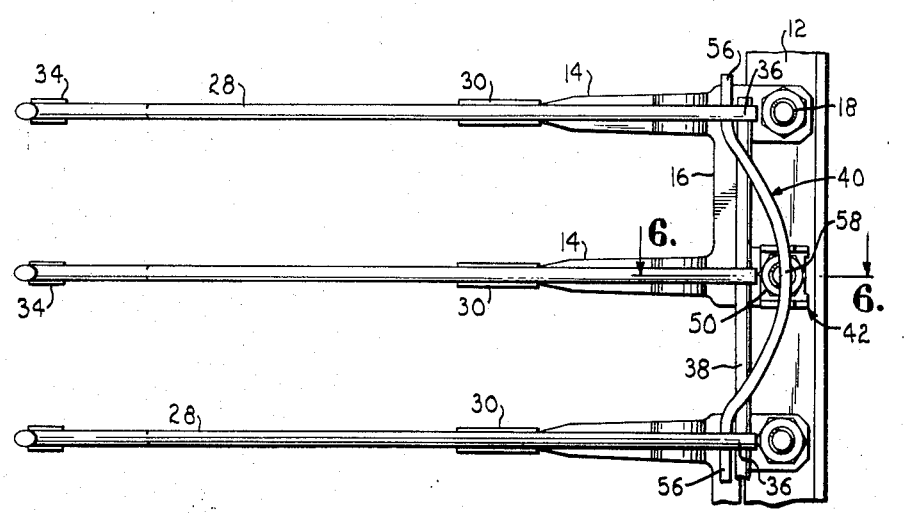

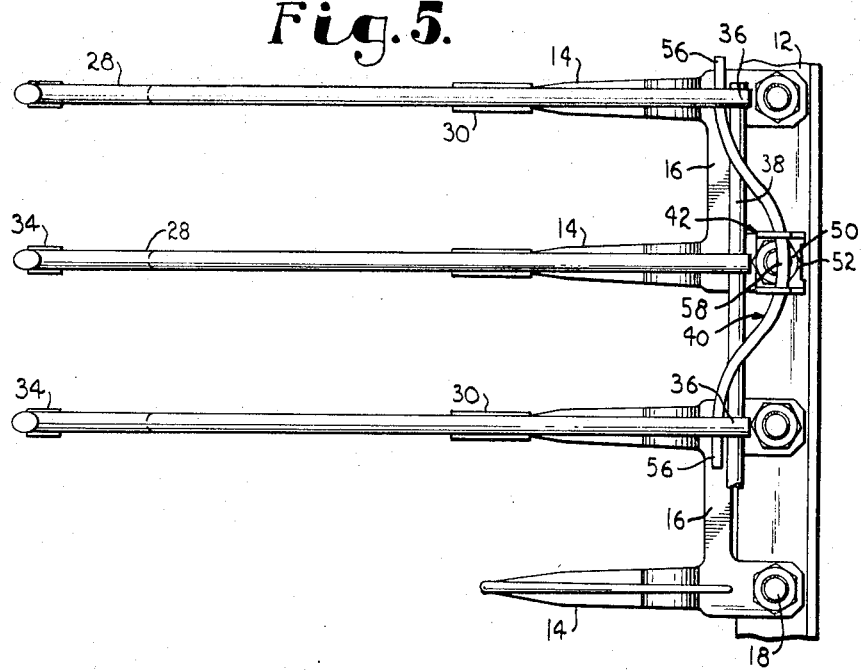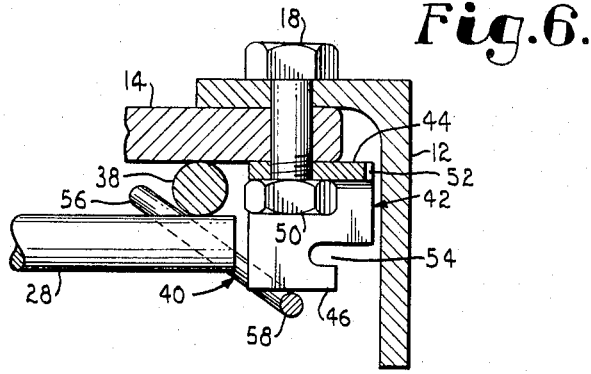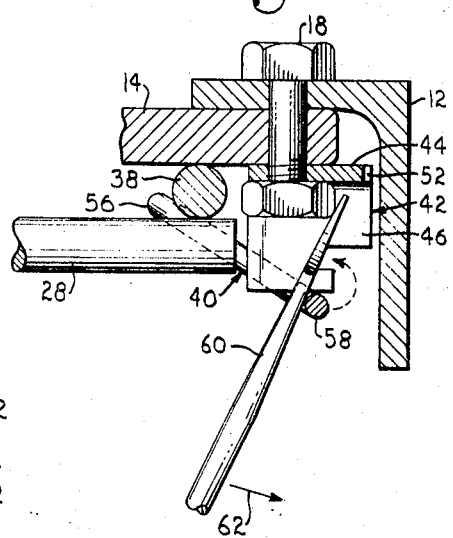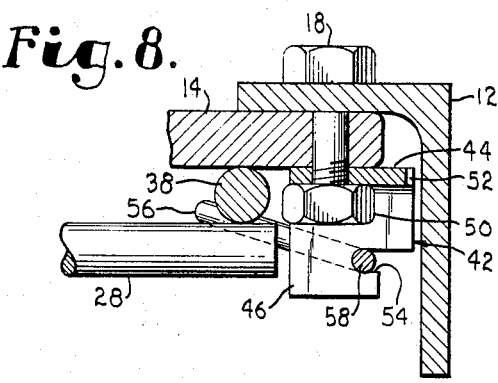

DEVICE FOR ATTACHING TINE EXTENSIONS TO CUTTER BAR

This invention relates to improvements in devices for detachably securing sickle guard extensions to the cutter bar assembly of a combine, particularly guard extension attachments of the type having tines for preventing the loss of cut crop heads.

In U. S. Pat. No. 2,839,884 owned by the assignee herein, a sickle guard extension attachment is disclosed which serves to retrieve cut-off crop heads and deliver the same to the collector behind the cutter bar assembly. Attachments of this type employ flexible wire tines which prevent the cut crop heads from falling onto the ground in front of the cutter bar before they can be swept into the collector of the combine, commonly an auger trough disposed directly behind the cutter bar assembly beneath and rearwardly of the reel of the combine header. Particularly in the harvesting of crops such as milo, the cut heads tend to fall away from the cutter bar in a forward direction or drop to the ground between the sickle guards, resulting in a decreased yield from that which would be obtained without the lossage.

The wire tines in extension attachments such as disclosed in the aforesaid patent extend forwardly and upwardly at an inclination from each of the sickle guards of the cutter bar assembly; accordingly, the tines have a backward pitch or rearwardly downward slope which causes the cut-off heads falling upon the tines to roll backward into the auger trough where the heads are fed to the threshing apparatus of the combine. In combining other crops, however, the attachment is not desired, thereby requiring that means be provided to detachably secure the extension attachment to the cutter bar assembly. The patent cited above illustrates several such means of securing the extensions to the cutter bar, depending upon the configuration of the support bar upon which the sickle guards are secured.

In previous practice, as illustrated in the above patent, it has been necessary to provide many different types of releasable fastening devices appropriately designed to accommodate the particular cutter bar assembly with which the extension attachment is to be utilized. These devices have taken the form of clips and brackets of various configurations as suggested by the illustrations in FIGS. 6, 7 and 8 of this patent. It may be appreciated that the support bar of the cutter bar assembly may be of various structural shapes depending upon the manufacturer, and even the common angle member configurations vary so widely that different clips or brackets have been required to accommodate the number of cutter bar assemblies that are commercially available.

It is, therefore, the primary object of the present invention to provide a fastening device of universal character which may be employed to detachably secure sickle guard extensions to the cutter bar assembly of a header, in order that a large number of cutter bar configurations may be accommodated without having to provide a corresponding number of different fastening devices.

As a corollary to the foregoing object, it is an important aim of this invention to provide a device as aforesaid which may be easily and conveniently operated when it is desired to secure the sickle guard extensions to the header or detach such extensions therefrom, wherein special tools are not required and the universal character of the device renders it possible to utilize the extension attachment with various makes of combines as may be desired without separate installation hardware being required for the different cutter bar configurations.

Furthermore, it is an important object of this invention to provide a device as aforesaid which does not require substantial modification of the cutter bar assembly to which the guard extensions are to be attached, and wherein one component of the device is permanently mounted on the cutter bar by one of the sickle guard bolts without the addition of special hardware of any kind.

Additionally, it is an important object of this invention to provide devices as aforesaid which may be arranged along a cutter bar as required to lock the guard extensions in place, wherein adaptation of the cutter bar assembly to the devices requires no special hardware and involves only the installation of components of the devices at spaced locations along the cutter bar where sickle guard bolts are already provided.

In the drawings:

FIG. 1 is a fragmentary, top plan view of the header of a combine, showing the cutter bar assembly provided with a sickle guard extension attachment of the type discussed hereinabove, the reel of the header being omitted for clarity;

FIG. 2 is a vertical sectional view taken along line 2—2 of FIG. 1, showing the device of the present invention beneath one of the sickle guards;

FIG. 3 is a detail view showing the catch component of the device of the present invention in perspective and inverted relative to the position thereof when the cutter bar assembly is in normal use;

FIG. 4 is an enlarged, fragmentary bottom view of the cutter bar assembly seen in FIG. 1, omitting the sickle blade and wire tines and showing the device of the present invention before the clip is flexed;

FIG. 5 is a view similar to FIG. 4 but showing the clip in the flexed condition securing the extensions to the cutter bar;

FIG. 6 is an enlarged, fragmentary, cross-sectional view taken along line 6—6 of FIG. 4;

FIG. 7 is a view similar to FIG. 6 but illustrating the use of a screwdriver tip to install the clip; and FIG. 8 is a view similar to FIGS. 6 and 7 but showing the clip fully seated in the catch component after completion of the installation.

Referring initially to FIGS. 1 and 2, the cutter bar assembly of the header of a combine is broadly denoted by the numeral 10 and includes a support bar 12 extending transversely of the header and upon which a number of sickle guards 14 are mounted. The support bar 12 is in the form of an angle member as is clear in FIG. 2, and the sickle guards 14 comprise pairs of guards each joined by an integral crossbar 16. A bolt 18 through the support bar 12 is associated with each of the sickle guards 14 and secures the same to the bar 12 in the usual manner. A sickle blade 20 is received by the guards 14 and reciprocates in parallelism with the bar 12. A collector for the cut-off heads in the form of an auger trough 22 is disposed behind the cutter bar assembly 10, and the auger is shown at 24 for feeding the heads to the threshing apparatus (not shown) of the combine. Although not illustrated, it will be appreciated that the combine header is provided with the usual reel above and in front of the auger 24 for pushing the heads of the crop into the sickle 20.

As disclosed in the aforementioned U.S. Pat. No. 2,839,884, the sickle guards 14 are provided with an attachment broadly denoted 26 comprising a plurality of extension rods 28 projecting forwardly from corresponding guards 14. Each of the extension rods 28 is provided with an inverted, U-shaped clip presenting a socket member 30 that forms a pocket receiving the point of the guard 14. The rods 28 serve as supports for flexible wire tines 32 arranged in pairs on each of the rods 28. A tine clip 34 on the end of each rod 28 attaches a pair of the tines 32 to the rod 28, the tine pair being in the form of a single wire member bent back upon itself to form a generally hairpin shape as seen in FIG. 1, the apex of the member presenting the leading tip thereof which is secured to the forward end of the rod 28 by the clip 34. Each pair of tines is slightly divergent as they extend rearwardly, and the tines 34 also slope rearwardly downward over the cutter bar assembly 10 as is clear in FIG. 2, terminating just in front of the auger trough 22.

As is clear in FIGS. 2, 4 and 5, the extension rods 28 extend rearwardly from the socket members 30 beneath the corresponding guards 14, the rear ends 36 of the rods 28 terminating below the horizontal flange portion of the angle support bar 12 and in front of the vertical flange portion thereof. For ease in handling and installation, the extension rods 28 may be arranged in sets having from three to eight extensions per set. Accordingly, the number of sets comprising the complete attachment 26 will depend upon the number of extensions per set and the number of sickle guards 24 of a given cutter bar assembly 10. A portion of one such multiple extension set is illustrated in detail in FIGS. 4 and 5 where it may be seen that a cross member 38 in the form of a rod welded to the ends 36 of the extensions 28 serves to connect the set of extensions together as a unit.

As best illustrated in FIGS. 3–8, the releasable fastening device of the present invention comprises an elongated, resilient clip element 40 associated with a series of three of the extension rods 28, three such extensions at one end of a set being shown in FIGS. 4 and 5. A hasp or catch 42 is secured to the support bar 12 adjacent the underside thereof by the sickle guard bolt 18 associated with the center guard 14 of the guard triplet upon which the series of three extensions are disposed. The catch 42 is of inverted, U-shaped configuration to present a horizontal bight 44 and a pair of depending legs 46. The threaded shank of the bolt 18 extends through an opening 48 in the bight 44, and a nut 50 on the shank secures the catch 42 in place. For purposes to be discussed hereinafter, the rear edge of the bight 44 is recessed at 52, and the legs 46 are provided with aligned notches 54 which face rearwardly.

The clip element 40 may comprise a steel spring wire and, in FIG. 4, the wire is shown in an unflexed condition prior to engagement with the catch component 42 of the fastening device. It should be noted that the end portions 56 of the clip element 40 extend over the rear ends 36 of the outer extension rods 28, just in front of the cross member 38, whereas the central portion 58 of the element 40 extends under the cross member 38 and rearwardly to the catch 42. FIG. 5 illustrates the element 40 in the flexed condition with the central portion 58 extending through the notches 54 of the catch 42 fully seated therewithin.

To prepare the cutter bar assembly 10 for use with the fastening devices of the present invention, the catch components 42 of the number of devices to be employed are mounted on the support bar 12 at spaced locations dictated by the configuration of the sets of extensions comprising the sections of the attachment 26. For example, assuming eight extension rods 28 per set, two catch components 42 would be employed for each set and located on the sickle guards 14 next to the end guards of each series of eight. Installation of each of the catches 42 is simply accomplished by unthreading the nut 50, slipping the catch on the bolt 18 as illustrated, and then retightening the nut 50. Accordingly, it may be appreciated that no modification of the cutter bar or special fasteners are required to install the catches 42, which are then left in place for use whenever it is desired to utilize the attachment 26.

FIGS. 6-8 illustrate the successive steps of attaching each of the clip elements 40 to secure the sets of extensions to the cutter bar. In FIG. 6 the element 40 is unflexed and has been placed in position by inserting the end portions 56 thereof between the ends 36 of the outboard extension rods 28 and the overlying guards 14 as shown in FIG. 4. Using a screwdriver tip 60 as depicted in FIG. 7, the operator inserts the tip 60 and, with a prying action as illustrated by the arrow 62, force is brought to bear on the central portion 58 of the element 40 to force such portion rearwardly. The element is thereby flexed and forced over the ends of the legs 46 of the catch 42, and into the notches 54 as illustrated by the broken line arrow in FIG. 7. FIG. 8 shows the clip element fully seated in the notches 54 in the flexed condition.

With the clip element 40 in place as shown in FIGS. 5 and 8, the end portions 56 thereof are in interlocking engagement with the ends 36 of the outboard extension rods 28 and the cross member 38 which bridges the rear ends 36. Accordingly, the central portion 58 of the clip element 40 being securely held by the catch 42, a positive lock is formed which holds the extension rods 28 rigidly on the sickle guards 14 and yet permits the attachment 26 to be quickly removed from the cutter bar for cutting operations in which the tines 32 are either not desired or not necessary. Unlocking of each device is accomplished by simply reinserting the screwdriver tip 60 as illustrated in FIG. 7, except that now the recess 52 is useful in that it permits greather insertion of the screwdriver for additional leverage in prying the clip element back out of the notches 54.

From the foregoing, it may also be appreciated that the device of the present invention does not depend upon any particular configuration of the support bar 12 to achieve its fastening function. Since the catch components 42 are mounted directly on the sickle guard bolts 18, the configuration of the support bar 12 is immaterial.

Having thus described the invention, what is claimed as new and desired to be secured by Letters Patent is:

1. For use with a cutter bar assembly of a harvesting machine, wherein said assembly includes a transversely extending support bar having a plurality of sickle guards spaced therealong and extending forwardly therefrom, and wherein said assembly is provided with an attachment for retrieving and delivering cut-off crop heads to a collector therefor rearwardly of said assembly, said attachment including a plurality of spaced extensions on corresponding guards projecting forwardly therefrom and having rear ends disposed beneath said guards, a releasable device for detachably securing said attachment to said assembly comprising:
- a catch secured to said support bar adjacent the underside thereof;
- an elongated, resilient clip element extending transversely of said extensions and across those of said extensions adjacent said catch,
- said element having a pair of opposed end portions and an intermediate portion between said end portions,
- said end portions engaging a corresponding pair of said extensions on opposite sides of said catch, and said element being flexed rearwardly to engage said intermediate portion with said catch,
- said catch having means receiving the intermediate portion of the flexed element to hold the latter in flexed condition; and
- means on said pair of extensions adjacent their rear ends holding said end portions against movement out of engagement therewith under the force of flexure exerted by said element in said flexed condition.

2. The device as claimed in claim 1, wherein is provided means securing said catch to said support bar at a location between the pair of guards on which said pair of extensions are disposed.

3. The device as claimed in claim 1, wherein said assembly further includes fasteners securing said guards to said support bar, and wherein said catch is secured to said support bar by one of said fasteners.

4. The device as claimed in claim 3, wherein said catch is of inverted, generally U-shaped configuration to present a bight and a pair of depending legs, said legs having aligned notches therein presenting said receiving means, said one fastener engaging said catch at said bight.

5. The device as claimed in claim 1, wherein said pair of extensions are on opposite sides of a third of said extensions, there being means securing said catch to said support bar at the guard on which said third extension is disposed.

6. For use with a cutter bar assembly of a harvesting machine, wherein said assembly includes a transversely extending support bar having a plurality of sickle guards spaced therealong and extending forwardly therefrom, and wherein said assembly is provided with an attachment for retrieving and delivering cut-off crop heads to a collector therefor rearwardly of said assembly, said attachment including a plurality of spaced extensions on corresponding guards projecting forwardly therefrom and having rear ends disposed beneath said guards, and a cross member under said guards rigid with said extensions and spanning the latter adjacent the rear ends thereof, a releasable device for detachably securing said attachment to said assembly comprising:
- a catch secured to said support bar adjacent the underside thereof; and
- an elongated, resilient clip element extending transversely of said extensions and across those of said extensions adjacent said catch,
- said element having a pair of opposed end portions and being flexed rearwardly into engagement with said catch, with said end portions in interlocking engagement with said cross member and with a corresponding pair of said extensions on opposite sides of said catch,
- said catch having means receiving the flexed element to hold the latter in flexed condition.

7. The device as claimed in claim 6, wherein said element has an intermediate portion between said end portions thereof, said intermediate portion engaging said catch.

8. The device as claimed in claim 7, wherein said intermediate portion of the element extends under said cross member, and each of said end portions of the element extends over the corresponding extension of said pair of extensions adjacent the rear end thereof, whereby to provide said interlocking engagement.

9. The device as claimed in claim 6, wherein said assembly further includes fasteners securing said guards to said support bar, and wherein said catch is secured to said support bar by one of said fasteners.

10. The device as claimed in claim 6, wherein said pair of extensions are on opposite sides of a third of said extensions, there being means securing said catch to said support bar at the guard on which said third extension is disposed.

* * * * *